(12) United States Patent
Takeda

(10) Patent No.: US 12,026,324 B2
(45) Date of Patent: Jul. 2, 2024

(54) ELECTRONIC APPARATUS

(71) Applicant: SEIKO EPSON CORPORATION, Tokyo (JP)

(72) Inventor: Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/360,768

(22) Filed: Jul. 27, 2023

(65) Prior Publication Data

US 2024/0036659 A1 Feb. 1, 2024

(30) Foreign Application Priority Data

Jul. 29, 2022 (JP) .................... 2022-121344

(51) Int. Cl.
| | |
|---|---|
| G06F 3/0354 | (2013.01) |
| G02B 27/10 | (2006.01) |
| G02B 27/14 | (2006.01) |
| G06F 3/038 | (2013.01) |

(52) U.S. Cl.
CPC ..... *G06F 3/03542* (2013.01); *G02B 27/1086* (2013.01); *G02B 27/144* (2013.01); *G06F 3/038* (2013.01)

(58) Field of Classification Search
CPC .... G06F 3/038; G06F 3/03542; G02B 27/144
USPC ........................................................ 345/157
See application file for complete search history.

(56) References Cited

U.S. PATENT DOCUMENTS

| | | | |
|---|---|---|---|
| 9,958,954 B2 * | 5/2018 | Geaghan | G06F 3/0202 |
| 11,301,063 B2 * | 4/2022 | King, Jr. | G06V 30/32 |
| 2004/0041798 A1 * | 3/2004 | Kim | G06F 1/169 |
| | | | 345/179 |

FOREIGN PATENT DOCUMENTS

JP 2004139562 5/2004

* cited by examiner

*Primary Examiner* — Calvin C Ma
(74) *Attorney, Agent, or Firm* — JCIPRNET

(57) ABSTRACT

An electronic pen is provided with a light source that emits irradiation light, a rotatable rotating body, a deflecting member that deflects, toward the rotating body, the irradiation light emitted by the light source and transmits the irradiation light reflected by the rotating body, and a detecting member that receives the irradiation light transmitted through the deflecting member.

14 Claims, 13 Drawing Sheets

ELECTRONIC APPARATUS

The present application is based on, and claims priority from JP Application Serial Number 2022-121344, filed Jul. 29, 2022, the disclosure of which is hereby incorporated by reference herein in its entirety.

BACKGROUND

1. Technical Field

The present disclosure relates to an electronic apparatus capable of moving a pointer or a cursor.

2. Related Art

In related art, as disclosed in JP-A-2004-139562, a pointing device is known that detects a direction in which a ball rotates, by emitting irradiation light from a light source toward the ball and receiving the irradiation light reflected by the ball, using an optical image sensor.

However, in the pointing device disclosed in JP-A-2004-139562, since an optical path from the light source to the ball and an optical path from the ball to the optical image sensor are separately disposed, there is a problem that the pointing device becomes large.

SUMMARY

An electronic apparatus according to an aspect of the present disclosure includes a light source configured to emit irradiation light, a rotating body configured to rotate, a first deflecting member configured to deflect, toward the rotating body, the irradiation light emitted by the light source and to transmit the irradiation light reflected by the rotating body, and a detecting member configured to receive the irradiation light transmitted through the first deflecting member.

Further, an electronic apparatus according to another aspect of the present disclosure includes a light source configured to emit irradiation light, a rotating body configured to rotate, a first deflecting member configured to transmit, toward the rotating body, the irradiation light emitted by the light source and to deflect the irradiation light reflected by the rotating body, and a detecting member configured to receive the irradiation light deflected by the first deflecting member.

DESCRIPTION OF EXEMPLARY EMBODIMENTS

1-1 First Embodiment

A schematic configuration of an electronic pen 1, as an electronic apparatus according to a first embodiment, will be described.

The electronic pen 1 is a pen-shaped pointing device used together with an information processing device, such as a PC, a smartphone terminal, a tablet terminal, or the like. With the electronic pen 1, a user can perform an operation of moving a pointer or a cursor displayed on a display or the like of the information processing device, and can perform a click operation. The electronic pen 1 can accurately perform the operation not only in an upright state but also in a state of being inclined at a given angle within a predetermined range.

Figure 1:
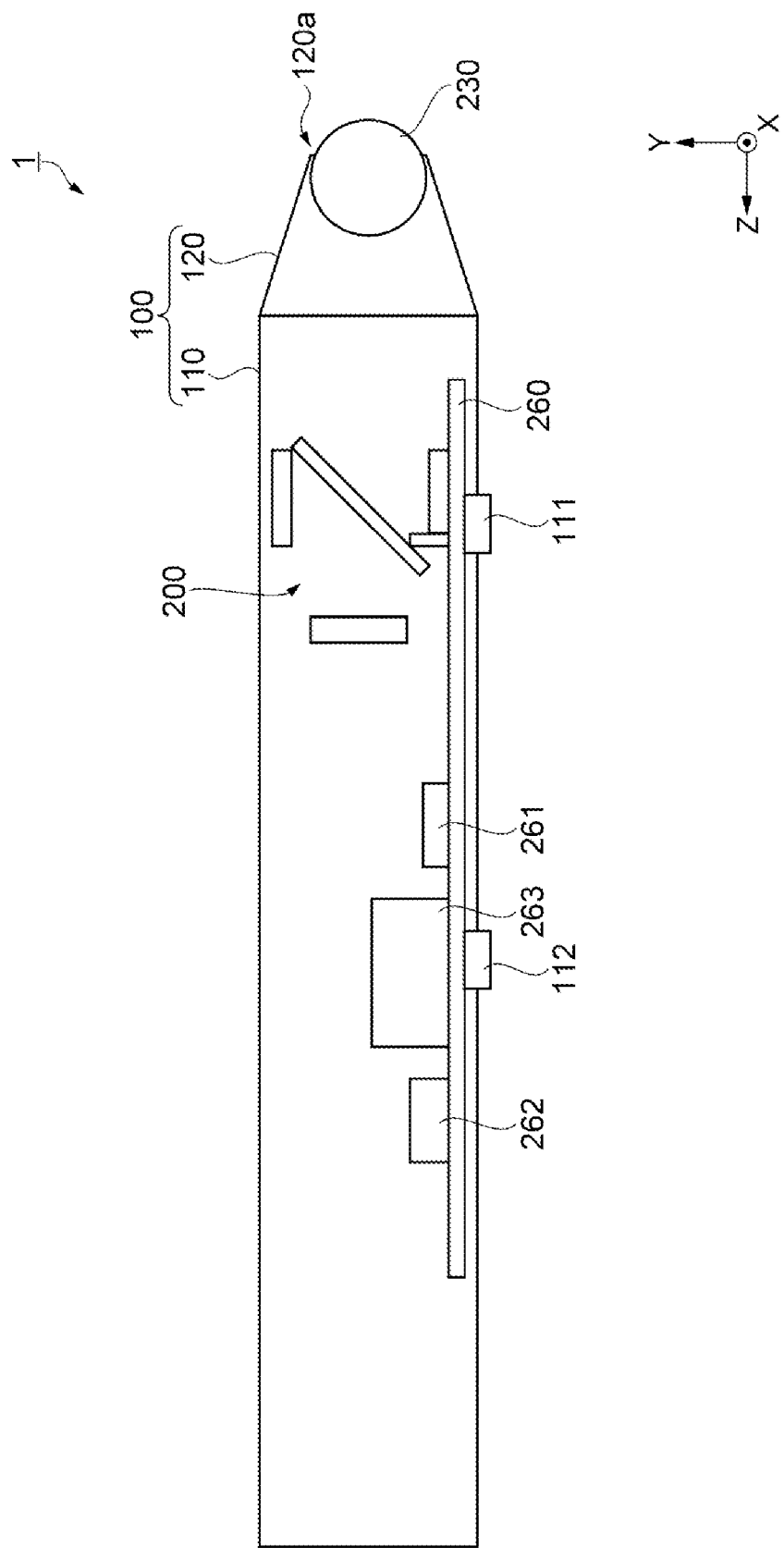
FIG. 1 is a cross-sectional view illustrating a schematic configuration of an electronic pen according to a first embodiment.

In FIG. 1 and the like, X, Y, and Z represent an orthogonal coordinate system. A Z-axis is a coordinate axis parallel to a lengthwise direction of the electronic pen 1, and a direction from a pen tip at one end of the electronic pen 1 toward the other end thereof is a positive Z direction. Further, a Y-axis is a coordinate axis perpendicular to the surface of a substrate 260 disposed along the Z-axis inside the electronic pen 1. The substrate 260 is disposed on a negative Y side inside the electronic pen 1. That is, of both surfaces of the substrate 260, a direction from the back surface facing a relatively narrow space toward the front surface facing a relatively wide space is a positive Y direction. An X-axis is a coordinate axis perpendicular to the Y-axis and the Z-axis, and, as illustrated in FIG. 1, when the positive Y direction is upward and the positive Z direction is leftward, a direction from the back to the front is a positive X direction.

FIG. 1 is a cross-sectional view illustrating a schematic configuration of the electronic pen 1. The electronic pen 1 is provided with an optical device 200, and an exterior member 100 that covers components such as the optical device 200 and the like. The exterior member 100 includes a handle 110 and a pen tip 120.

The handle 110 is a hollow member and accommodates the optical device 200 and the like in the interior thereof. The shape of the handle 110 is not particularly limited, but is preferably a cylindrical columnar shape or a hexagonal columnar shape extending along the Z direction. Further, two buttons 111 and 112 are disposed at the handle 110.

The button 111 is disposed at the negative Y side of the handle 110 and receives a specific operation from the user. The specific operation is not particularly limited, but may be an operation such as a click operation or the like.

The button 112 is disposed at the negative Y side of the handle 110 and further in the positive Z direction than the button 111. The button 112 functions as a power switch of the optical device 200. Note that the layout of the buttons 111 and 112 is not limited to that described above.

A rotating body 230, which is a part of the optical device 200, is accommodated in the pen tip 120 of the exterior member 100. The rotary body 230 is accommodated such that a part thereof is exposed to the outside from an opening 120a formed at the negative Z side of the pen tip 120, and such that the rotating body 230 can rotate freely as a result of the exposed part coming into contact with an external object.

The exterior member 100 may have a configuration in which the handle 110 and the pen tip 120 are integrated with each other, or may have a configuration in which the handle 110 and the pen tip 120 are separate from each other. When the handle 110 and the pen tip 120 are configured to be separate from each other, although not illustrated, a structure, such as a fitting structure or an engaging structure, may be provided in each of the handle 110 and the pen tip 120.

Figure 2:
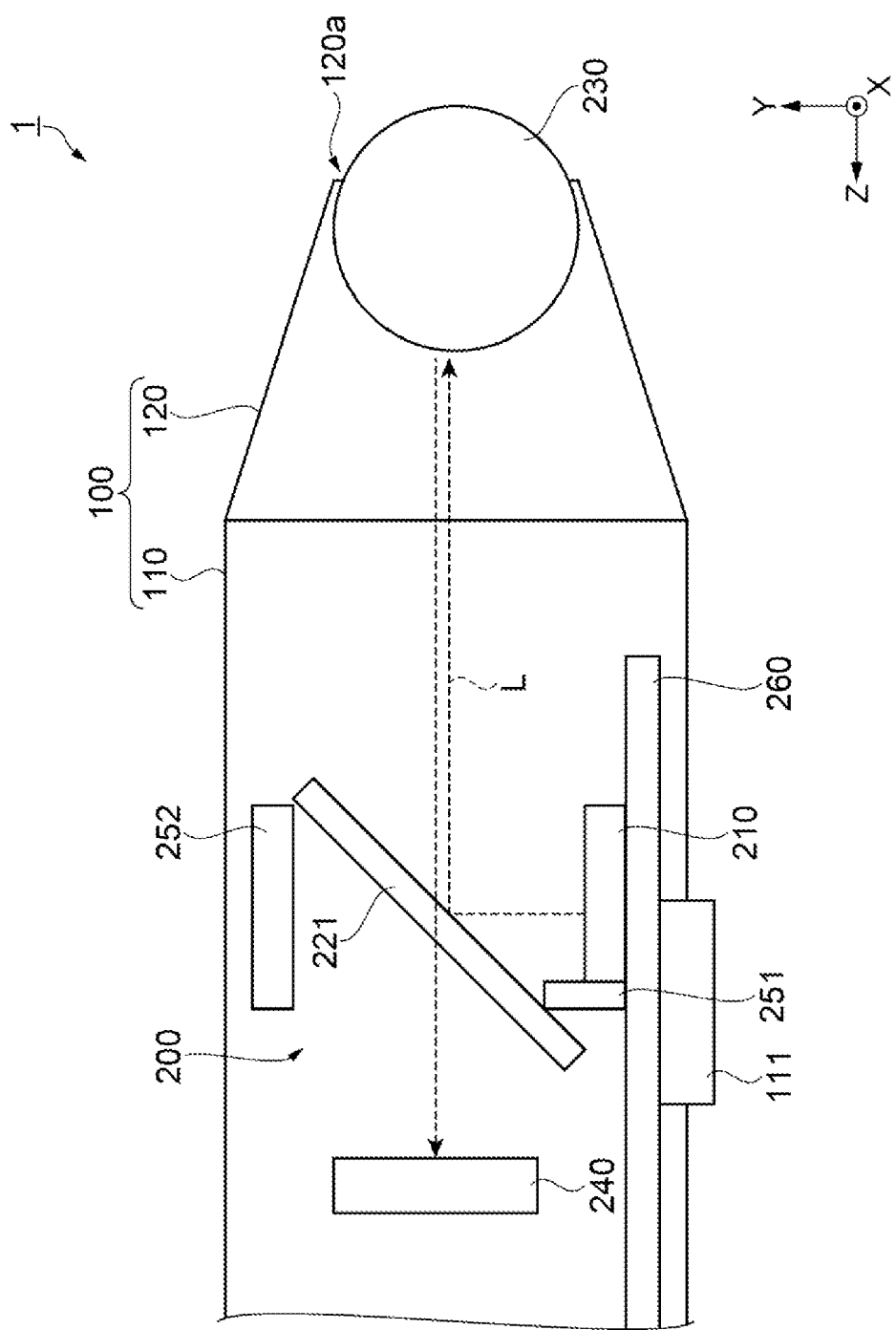
FIG. 2 is an enlarged cross-sectional view illustrating a schematic configuration of an optical device of the electronic pen according to the first embodiment.

FIG. 2 is an enlarged cross-sectional view illustrating a schematic configuration of the optical device 200 of the electronic pen 1 according to the first embodiment. The optical device 200 includes a light source 210, a deflecting member 221 as a first deflecting member, the rotating body 230, a detecting member 240, and light-absorbing members 251 and 252.

The light source 210 is disposed on the surface on the positive Y side of the substrate 260. The light source 210 emits irradiation light L in the positive Y direction. Examples of the light source 210 include a laser, an LED, and the like. When the laser is used as the light source 210, it is possible to further reduce power consumption while improving detection accuracy. Further, when the laser is used as the light source 210, the irradiation light L is preferably infrared light having a wavelength from 750 to 1000 nm.

The deflecting member 221 is disposed on the positive Y side of the light source 210. The deflecting member 221 deflects a part of the irradiation light L emitted in the positive Y direction by the light source 210 toward the negative Z direction in which the rotating body 230 is disposed. Further, the deflecting member 221 transmits a part of the irradiation light L reflected by the rotating body 230 and traveling in the positive Z direction toward the detecting member 240 to be described below. In other words, in the Z direction, the deflecting member 221 is disposed between the rotating body 230 and the detecting member 240.

By disposing the deflecting member 221 between the rotating body 230 and the detecting member 240, it is possible to arrange the deflecting member 221, the rotating body 230, and the detecting member 240 in a linear manner in the Z direction, and to thus suppress an increase in the size of the optical device 200 in the Y direction and the X direction.

The deflecting member 221 deflects or transmits the irradiation light L such that an optical path from the light source 210 to the rotating body 230 and an optical path from the rotating body 230 to the detecting member 240 overlap each other between the deflecting member 221 and the rotating body 230. In other words, the optical path from the light source 210 to the rotating body 230 and the optical path from the rotating body 230 to the detecting member 240 coincide with or are in close proximity with each other between the deflecting member 221 and the rotating body 230.

The deflecting member 221 according to the embodiment is a half mirror constituted by a metal film or a dielectric multilayer film, for example, and, as well as deflecting a part of the incident irradiation light L by reflection, transmits the other part. The deflecting member 221 is disposed in a posture in which a reflection surface thereof is inclined at substantially 45° with respect to both the Y-axis and the Z-axis, such that the irradiation light L emitted from the light source 210 in the positive Y direction can be reflected in the negative Z direction. The deflecting member 221 is supported at the handle 110 or the substrate 260, by a support member (not illustrated). The deflecting member 221 is not limited to being the half mirror, and it is sufficient that the deflecting member 221 be a semi-transmissive and semi-reflective member that transmits a part of the incident light and reflects the other part of the incident light. Further, the reflectance of the deflecting member 221 of the present embodiment is from 10% to 90%, and is more preferably 70%.

As described above, a part of the rotating member 230 on the negative Z side is exposed from the opening 120a of the pen tip 120. The rotating body 230 rotates when the exposed part comes into contact with an object, such as a mouse pad, a desk, or the like. The part of the rotating body 230 on the positive Z side reflects the irradiation light L, which is deflected in the negative Z direction by the deflecting member 221, in the positive Z direction.

The rotating body 230 is, for example, a small sphere formed of metal, resin, ceramic, or the like. The rotating body 230 may have fine irregularities or patterns on the surface thereof. By forming the fine irregularities or the patterns on the rotating body 230, the brightness distribution of the irradiation light L reflected by the rotating body 230 becomes non-uniform, and a light and dark pattern is formed. Then, the light and dark pattern of the irradiation light L incident on the detecting member 240 changes when the rotating body 230 rotates. A movement amount and a movement direction of the rotating body 230 can be acquired based on changes over time of this light and dark pattern. Note that when the laser is used as the light source 210, the fine irregularities or the patterns need not necessarily be formed on the surface of the rotating body 230. This is because when the laser is used as the light source 210, a speckle pattern is generated in the irradiation light L reflected by the rotating body 230, and the movement amount and the movement direction of the rotating body can be acquired based on the speckle pattern. The speckle pattern is a light and dark pattern of an irregular granular pattern generated by interference between reflected light beams when light is irradiated onto the surface of an object.

The detecting member 240 is disposed further in the positive Z direction than the deflecting member 221, and is disposed further in the positive Y direction than the light source 210. The detecting member 240 includes a photoreceptor element that receives light, and is supported at the handle 110 or the substrate 260 by a support member (not illustrated) such that a photoreceptor surface of the photoreceptor element faces the negative Z direction. The photoreceptor element includes, for example, a light amount sensor array disposed in an 18×18 matrix, specifically, a photodiode array. In this way, the detecting member 240 receives the irradiation light L reflected by the rotating body 230 and transmitted through the deflecting member 221.

Using the photoreceptor element, the detecting member 240 detects the light and dark pattern from the rotating body 230 at a predetermined period. A control unit 261, which will be described later, acquires the movement amount and the movement direction of the rotating body 230, on the basis of a correlation between a series of the light and dark patterns that change over time.

The light-absorbing member 251 is disposed further in the positive Z direction than the light source 210, and is disposed further in the negative Z direction than the detecting member 240. That is, in the Z direction, the light-absorbing member 251 is disposed between the light source 210 and the detecting member 240. The light-absorbing member 251 is a member having light-absorbing properties and is, for example, a member coated with black paint. The light-absorbing member 251 inhibits the irradiation light L in a divergent state emitted from the light source 210 from being directly incident on the detecting member 240.

The light-absorbing member 252 is disposed on the positive Y side of the deflecting member 221. The light-absorbing member 252 is a member having light absorbing properties, and is, for example, a member coated with black paint. The light-absorbing member 252 is disposed on the opposite side of the light source 210 with respect to the deflecting member 221.

Of the laser light L emitted from the light source 210, the light-absorbing member 252 absorbs the part of the irradiation light L that is transmitted through the deflecting member 221 without being deflected by the deflecting member 221. In this way, it is possible to inhibit the part of the irradiation light L that is not deflected by the deflecting member 221 from being irregularly reflected by the inner wall of the exterior member 100 and being incident on the detecting member 240 as stray light.

The substrate 260 is disposed on the negative Y side inside the handle 110. The substrate 260 is supported by the handle 110, that is, by the exterior member 100, in a posture parallel to the X-axis and the Z-axis. As illustrated in FIG. 1, the control unit 261, a communication unit 262, and a power unit 263 are disposed on the substrate 260.

The control unit 261 controls operation of the electronic pen 1. For example, as described above, the control unit 261 performs image processing on the light and dark pattern of the irradiation light L acquired by the detecting member 240, and generates information about the movement amount and the movement direction of the rotating body 230, on the basis of the correlation between the series of the light and dark patterns that change over time. Further, the control unit 261 detects operations performed on the buttons 111 and 112.

Further, the control unit 261 is electrically coupled to the buttons 111 and 112, the light source 210, the detecting member 240, the communication unit 262, and the power unit 263 by wiring (not illustrated). This wiring includes, in addition to wiring formed on the substrate 260, wiring extending from the substrate 260 in the positive and negative Y directions, coupling members, and the like.

The communication unit 262 is capable of wirelessly communicating with an external information processing device, and transmits the information relating to the movement amount and the movement direction of the rotating body 230 to the information processing device. Further, when the control unit 261 detects that the button 111 is operated by the user, information indicating that the button 111 has been operated is transmitted to the information processing device. Note that the electronic pen 1 and the information processing device may be coupled to each other by wiring. In this case, the communication unit 262 transmits the above-described information and the like to the information processing device in a wired manner.

The power unit 263 includes a small battery, and switches between a state of supplying power to each of the units and a state of stopping the supply of the power, based on the operation of the button 112 by the user. The battery is not particularly limited, and may be, for example, a primary battery or a chargeable secondary battery.

The electronic pen 1 according to the first embodiment described above is provided with the light source 210 that emits the irradiation light L, the rotatable rotating body 230, the deflecting member 221 that deflects the irradiation light L emitted by the light source 210 toward the rotating body 230 and transmits the irradiation light L reflected by the rotating body 230, and the detecting member 240 that receives the irradiation light L transmitted through the deflecting member 221.

Claim 1

According to this configuration, the irradiation light L emitted from the light source 210 and deflected by the deflecting member 221 and the irradiation light L reflected by the rotating body 230 pass along the common optical path or along the optical paths in close proximity to each other between the deflecting member 221 and the rotating body 230. With this configuration, it is possible to suppress an increase in the size of the electronic pen 1, compared to a configuration in which the optical path from the light source 210 to the rotating body 230 and the optical path from the rotating body 230 to the detecting member 240 are separately disposed.

1-2 First Modified Example

Figure 3:
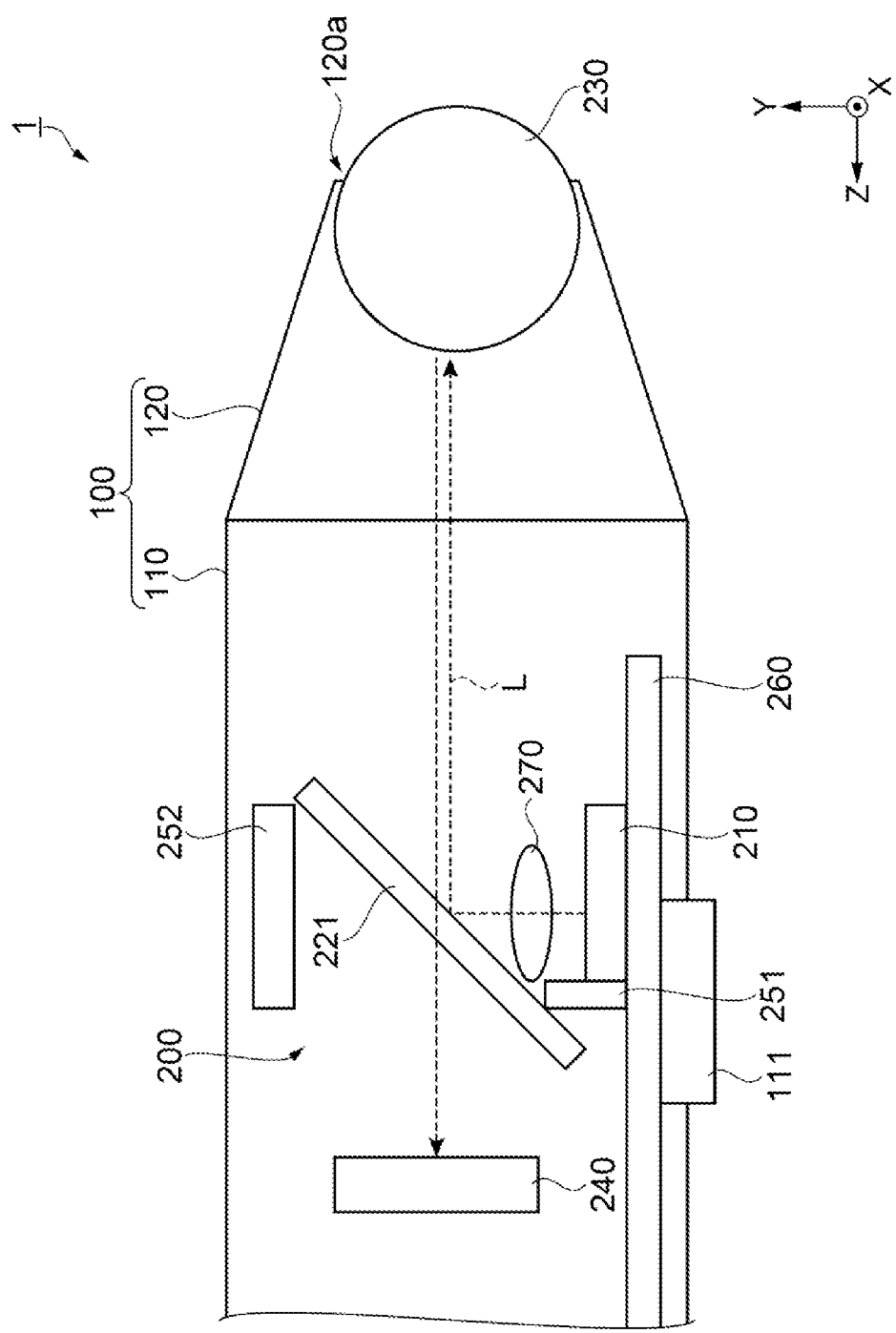
FIG. 3 is an enlarged cross-sectional view illustrating the optical device, according to a first modified example, of the electronic pen according to the first embodiment.

FIG. 3 is an enlarged cross-sectional view illustrating the optical device 200 according to a first modified example, of the electronic pen 1 according to the first embodiment. As illustrated in FIG. 3, the optical device 200 is provided with an optical member 270, between the light source 210 and the deflecting member 221. In other words, the optical member 270 is disposed on the positive Y side of the light source 210 and on the negative Y side of the deflecting member 221. The optical member 270 condenses or collimates the irradiation light L emitted in a divergent state from the light source 210. In this way, since the divergence of the irradiation light L is suppressed, it is possible to increase the light utilization rate of the irradiation light L emitted from the light source 210.

1-3 Second Modified Example

Figure 4:
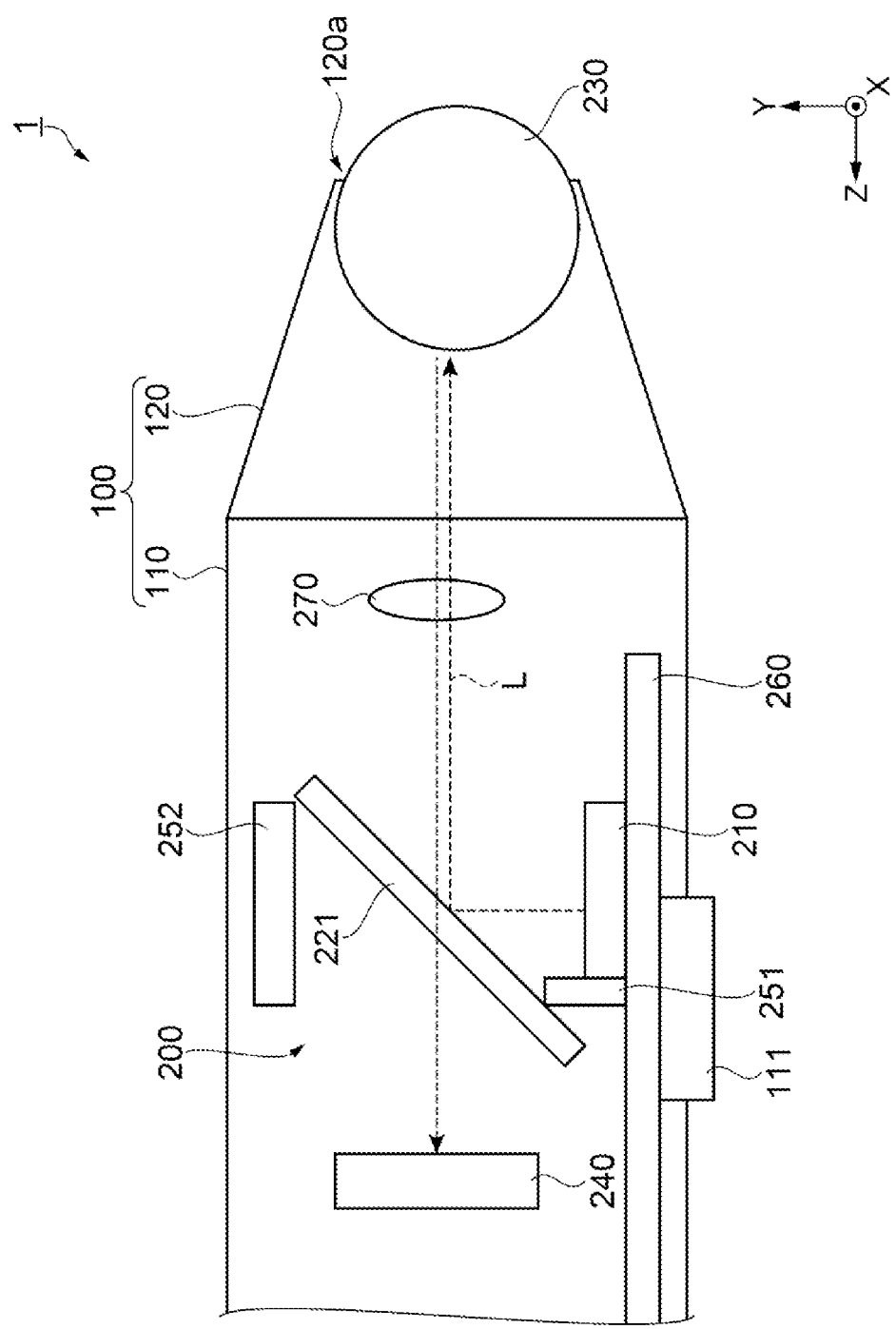
FIG. 4 is an enlarged cross-sectional view illustrating the optical device, according to a second modified example, of the electronic pen according to the first embodiment.

FIG. 4 is an enlarged cross-sectional view illustrating the optical device 200 according to a second modified example, of the electronic pen 1 according to the first embodiment. As illustrated in FIG. 4, the optical member 270 may be disposed between the deflecting member 221 and the rotating body 230. In other words, the optical member 270 may be disposed on the negative Z side of the deflecting member 221 and on the positive Z side of the rotating body 230. The irradiation light L directed to the rotating body 230 and the irradiation light L reflected by the rotating body 230 are condensed or collimated by the optical member 270. In other words, since the divergence of the irradiation light L is suppressed, it is possible to increase the light utilization rate of the irradiation light L emitted from the light source 210.

1-4 Third Modified Example

Figure 5:
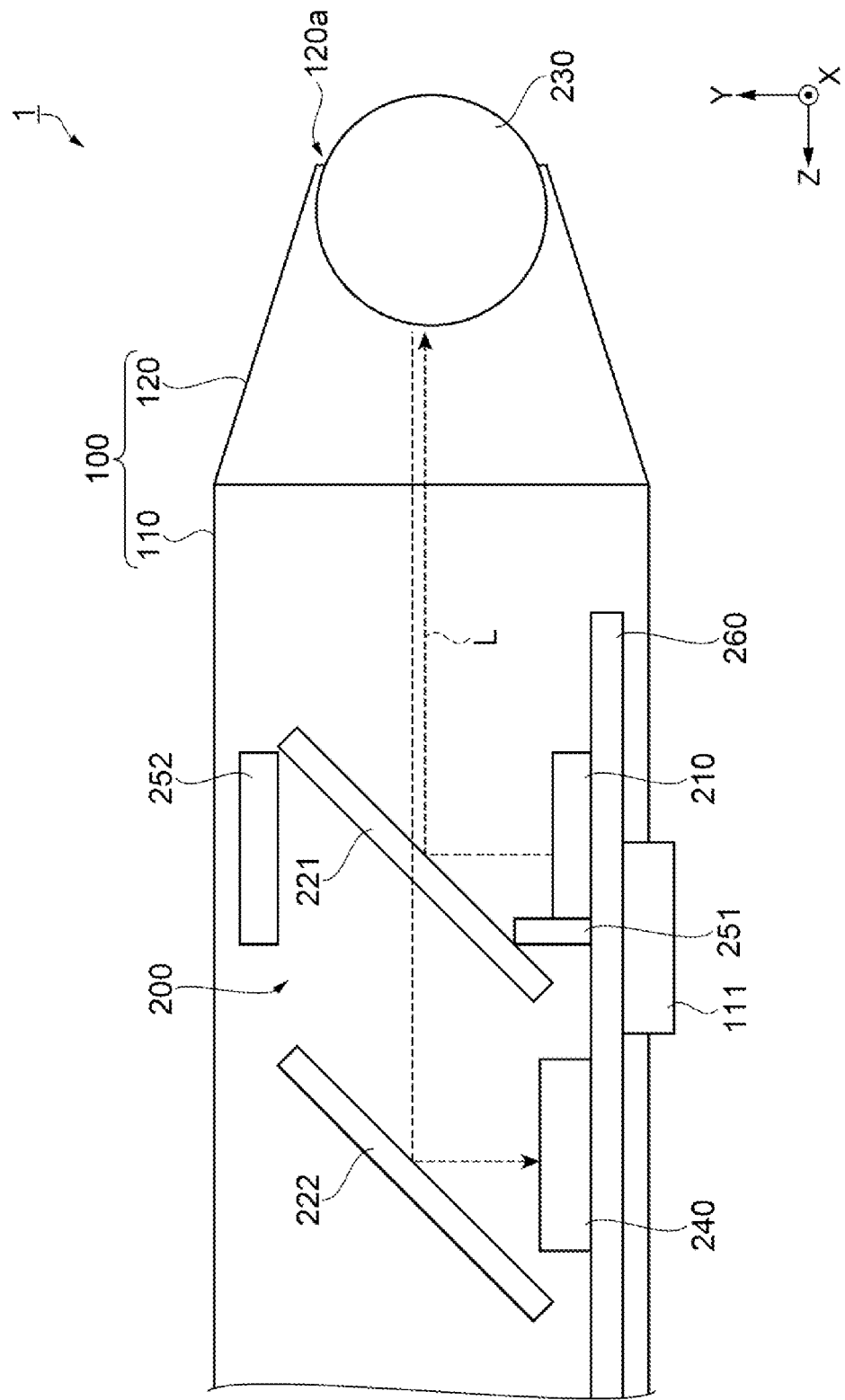
FIG. 5 is an enlarged cross-sectional view illustrating the optical device, according to a third modified example, of the electronic pen according to the first embodiment.

FIG. 5 is an enlarged cross-sectional view illustrating the optical device 200 according to a third modified example, of the electronic pen 1 according to the first embodiment. As illustrated in FIG. 5, the detecting member 240 may be disposed on the substrate 260, in a similar manner to the light source 210. In this case, the detecting member 240 is disposed on the substrate 260 on the positive Z side of the light source 210, with the photoreceptor surface oriented in the positive Y direction. For this reason, the optical device 200 is provided with a deflecting member 222 that deflects the irradiation light L transmitted through the deflecting member 221 toward the detecting member 240 on the substrate 260. In a similar manner to the deflecting member 221, the deflecting member 222 is, for example, a half mirror formed of a metal film or a dielectric multilayer film, and corresponds to a second deflecting member. The deflecting member 222 is disposed on the positive Y side of the detecting member 240, and is disposed in a posture parallel to the deflecting member 221, that is, in a posture in which a reflection surface thereof is inclined at substantially 45° with respect to both the Y-axis and the Z-axis, such that the irradiation light L traveling in the positive Z direction can be reflected in the negative Y direction. The deflecting member 222 is supported at the handle 110 or the substrate 260 by a support member (not illustrated). Since the light source 210 and the detecting member 240 are disposed on the same substrate 260, it is possible to reduce a coupling member or the like that electrically couples the detecting member 240 and the substrate 260, and it is thus possible to inhibit the configuration of the electronic pen 1 from becoming complicated.

1-5 Fourth Modified Example

In the first embodiment and the third modified example, the deflecting members 221 and 222 are the half mirror, but the configuration of the deflecting members 221 and 222 is not limited thereto. The deflecting members 221 and 222 may be, for example, a surface relief diffraction element or a volume hologram diffraction element. The surface relief diffraction element is a diffraction element having a resin layer in which a three-dimensional hologram is formed as a relief surface on a surface of a base unit. The volume hologram diffraction element is a diffraction element having an interference pattern as hologram stripes in a base portion.

Figure 6:
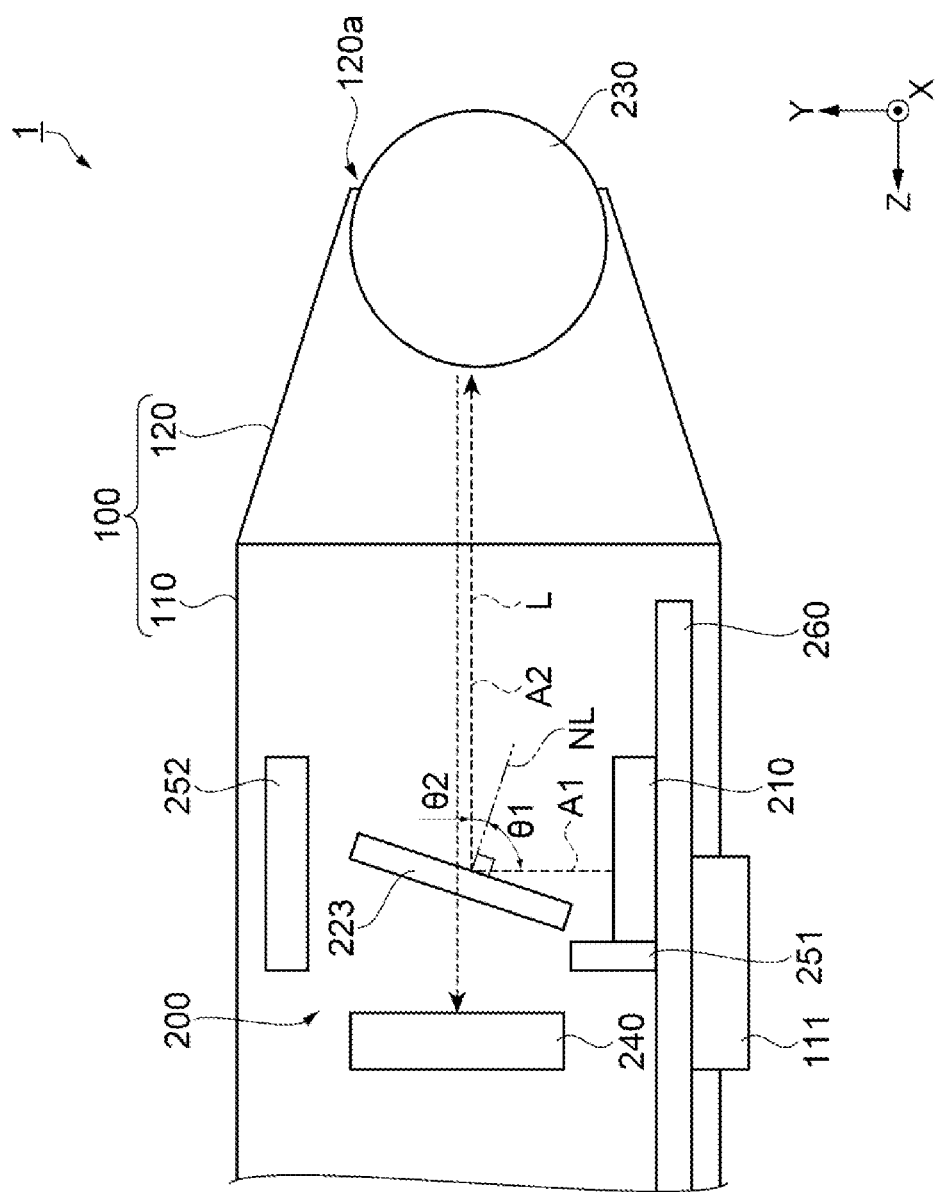
FIG. 6 is an enlarged cross-sectional view illustrating the optical device, according to a fourth modified example, of the electronic pen according to the first embodiment.

FIG. 6 is an enlarged cross-sectional view illustrating the optical device 200 according to the fourth modified example, of the electronic pen 1 according to the first embodiment, and illustrates a configuration in which a deflecting member 223 that is a diffraction element is used instead of the deflecting member 221. In a similar manner to the deflecting member 221, the deflecting member 223 corresponds to the first deflecting member.

As illustrated in FIG. 6, when the deflecting member 223 is the diffraction element, an angle θ2 formed between a normal line NL of a surface of the deflecting member 223 on which the irradiation light L is incident and a principal axis A2 of the irradiation light L deflected by the deflecting member 223 can be made smaller than an angle θ1 formed between a principal axis A1 of the irradiation light L from the light source 210 incident on the deflecting member 223 and the normal line NL. As a result, compared to when the deflecting member 221 that is the half mirror is used, it is possible to alleviate limitations on an angle of the deflecting member 223 with respect to the rotating body 230, and to shorten the length of the deflecting member 223 in the Z direction. By shortening the length of the deflecting member 223 in the Z direction, the distance between the rotating member 230 and the detecting member 240 can be reduced. Thus, an increase in the size of the optical device 200 in the Z direction can be suppressed.

The angle θ1 formed between the principal axis A1 of the irradiation light L from the light source 210 incident on the deflecting member 223 and the normal line NL is preferably greater than 45° and less than 85°, and is more preferably approximately 70°.

When the angle θ1 is equal to or less than 45°, the deflecting member 223 is inclined along the Z direction, and thus, although the length in the Y direction is suppressed, the length in the Z direction is increased compared to when the deflecting member 221 that is the half mirror is used. Therefore, when the angle θ1 is equal to or less than 45°, the distance between the rotating body 230 and the detecting member 240 becomes longer than when the deflecting member 221 that is the half mirror is used, and the size of the optical device 200 increases in the Z direction.

On the other hand, when the angle θ1 is equal to or greater than 85°, since the deflecting member 223 is inclined so as to be orthogonal to the Z direction, it becomes difficult to diffract the irradiation light L emitted by the light source 210 toward the rotating body 230. Accordingly, the light amount of the irradiation light L received by the detecting member 240 is reduced with respect to the light amount of the irradiation light L emitted by the light source 210, and the light use efficiency in the optical device 200 deteriorates.

Further, when the deflecting member 223 is the volume hologram diffraction element, it is possible to condense or collimate the irradiation light L in the divergent state, using the refractive index of the base portion and the hologram fringes. Accordingly, since it is not necessary to dispose the optical member 270 for condensing or collimating the irradiation light L in the divergent state, it is possible to reduce the number of the members inside the electronic pen 1.

1-6 Fifth Modified Example

Figure 7:
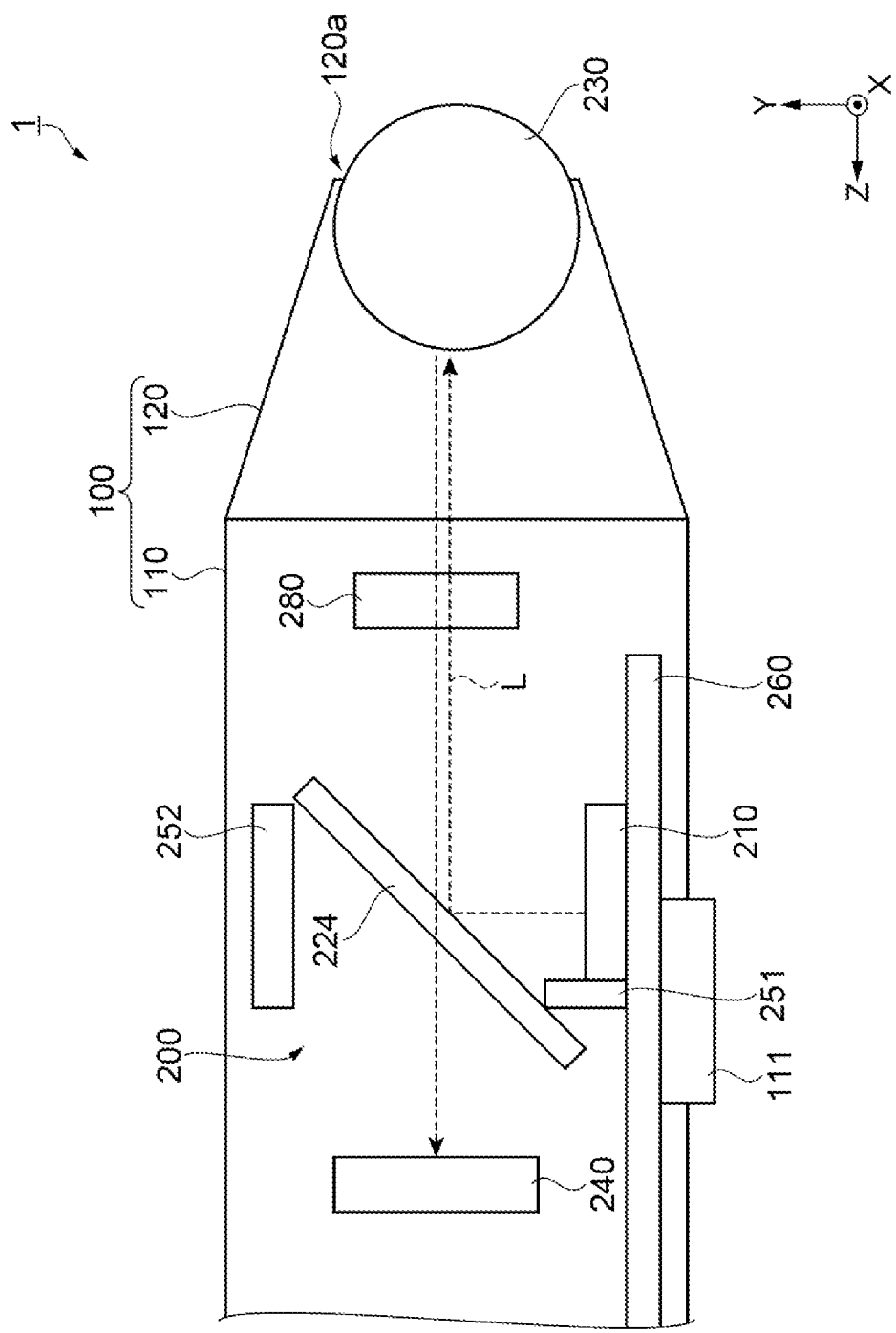
FIG. 7 is an enlarged cross-sectional view illustrating the optical device, according to a fifth modified example, of the electronic pen according to the first embodiment.

FIG. 7 is an enlarged cross-sectional view illustrating the optical device 200 according to a fifth modified example, of the electronic pen 1 according to the first embodiment. As illustrated in FIG. 7, the optical device 200 is provided with a deflecting member 224 instead of the deflecting member 221, and is provided with a λ/4 wave plate 280 between the deflecting member 224 and the rotating body 230. The λ/4 wave plate 280 is disposed between the deflecting member 224 and the rotating body 230 in the Z direction, that is, on the negative Z side of the deflecting member 224 and on the positive Z side of the rotating body 230. Further, in this configuration, the light source 210 emits the linearly polarized irradiation light L. Further, the deflecting member 224 is constituted by a polarization beam splitter, reflects polarized light having the same vibration direction as the linearly polarized irradiation light L emitted by the light source 210, and transmits polarized light having a vibration direction orthogonal to the vibration direction of the irradiation light L emitted by the light source 210. Note that, in a similar manner to the deflecting member 221, the deflecting member 224 corresponds to the first deflecting member. Further, the linearly polarized irradiation light L emitted by the light source 210 corresponds to first polarized light, and the polarized light having the vibration direction orthogonal to that of the first polarized light corresponds to second polarized light.

The linearly polarized irradiation light L emitted from the light source 210 is reflected by the deflecting member 224 toward the λ/4 wave plate 280. Subsequently, the linearly polarized irradiation light L changes from the linearly polarized light to circularly polarized light when passing through the λ/4 wave plate 280, and is incident on the rotating body 230.

The circularly polarized irradiation light L incident on the rotating body 230 is reflected by the rotating body 230 toward the λ/4 wave plate 280 and once more passes through the λ/4 wave plate 280. When passing through the λ/4 wave plate 280, the circularly polarized irradiation light L becomes linearly polarized light having a vibration direction orthogonal to that of the linearly polarized light of the irradiation light L emitted by the light source 210, and subsequently passes through the deflecting member 224 and is incident on the detecting member 240.

According to this configuration, most of the irradiation light L emitted from the light source 210 is deflected toward the rotating body 230 by the deflecting member 224 that is the polarization beam splitter. Further, most of the irradiation light L reflected by the rotating body 230 passes through the deflecting member 224. Thus, it is possible to increase the light utilization rate of the irradiation light L while suppressing stray light generated when the irradiation light L emitted from the light source 210 is transmitted without being deflected by the deflecting member 224.

Note that the linearly polarized irradiation light L emitted from the light source 210 is not particularly limited, and is, for example, S-polarized light or P-polarized light.

2-1 Second Embodiment

A schematic configuration of an electronic pen 2, as the electronic apparatus according to a second embodiment, will be described. Note that components common to those of the first embodiment will be denoted using the same reference numerals, and a description thereof will be omitted.

Figure 8:
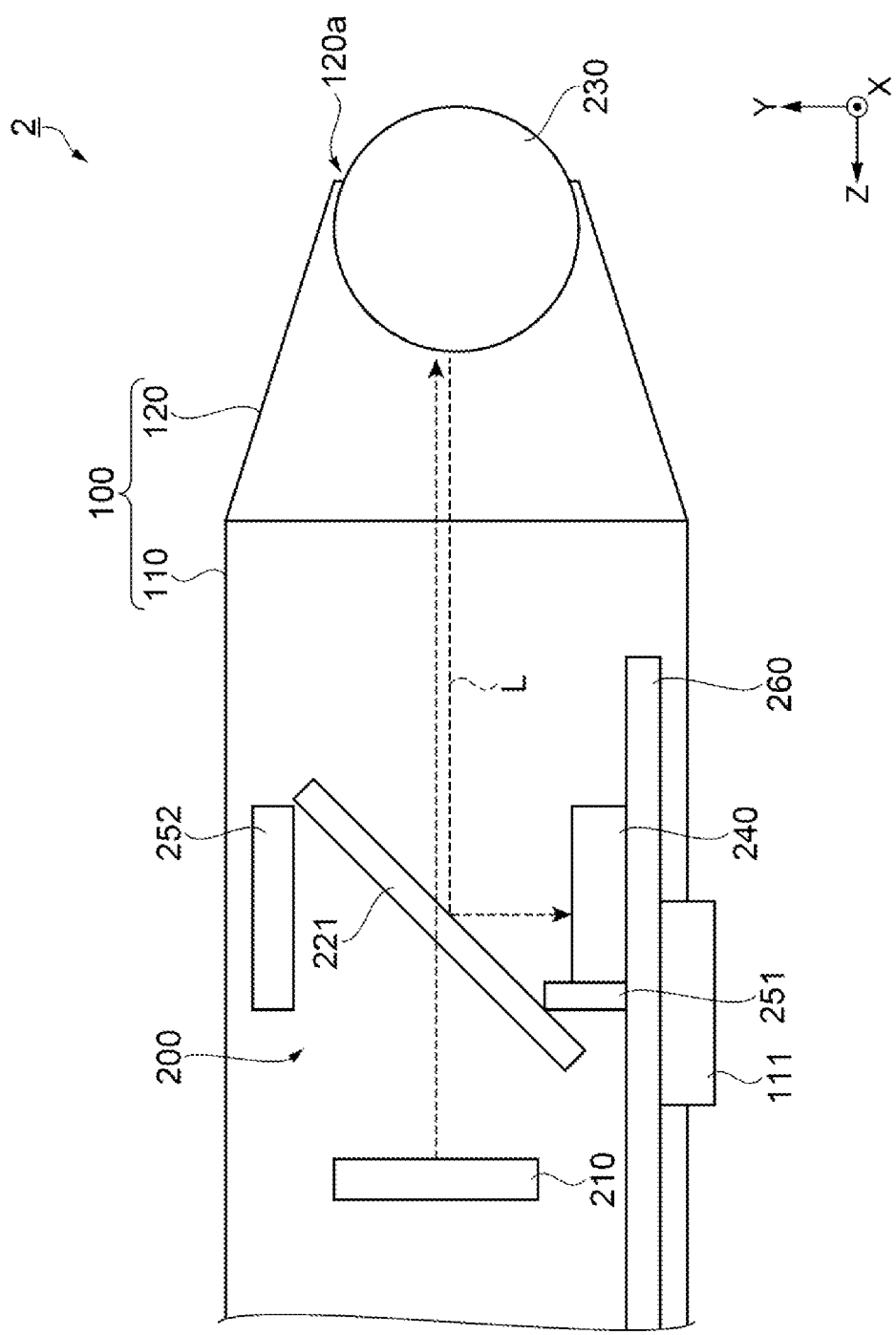
FIG. 8 is an enlarged cross-sectional view illustrating a schematic configuration of the optical device of an electronic pen according to a second embodiment.

FIG. 8 is an enlarged cross-sectional view illustrating a schematic configuration of the optical device 200 of the electronic pen 2 according to the second embodiment. In contrast to the electronic pen 1 according to the first embodiment, in the electronic pen 2, the detecting member 240 is disposed on the substrate 260 that is disposed on the negative Y side of the handle 110, and the light source 210 is provided in the positive Y direction and the positive Z direction with respect to the detecting member 240.

The light source 210 emits the irradiation light L in the negative Z direction. The light source 210 is supported at the handle 110 or the substrate 260 by a support member (not illustrated).

The deflecting member 221 is disposed further in the negative Z direction than the light source 210. The deflecting member 221 transmits a part of the irradiation light L emitted by the light source 210 in the negative Z direction toward the rotating body 230, and deflects a part of the irradiation light L reflected by the rotating body 230 and traveling in the positive Z direction, in the negative Y direction toward the detecting member 240 on the substrate 260. In other words, the deflecting member 221 is disposed between the light source 210 and the rotating body 230 in the Z direction.

By disposing the deflecting member 221 between the light source 210 and the rotating body 230, it is possible to arrange the deflecting member 221, the light source 210, and the rotating body 230 in a linear manner in the Z direction, and to thus suppress an increase in the size of the optical device 200 in the Y direction and the X direction.

The detecting member 240 is disposed further in the negative Y direction than the deflecting member 221. The detecting member 240 is disposed on the substrate 260 so that the photoreceptor surface of the photoreceptor element faces the positive Y direction, and receives the irradiation light L reflected by the rotating body 230 and deflected by the deflecting member 221.

The light-absorbing member 251 is disposed further in the positive Z direction than the detecting member 240 and further in the negative Z direction than the light source 210. In other words, the light-absorbing member 251 is disposed between the light source 210 and the detecting member 240 in the Z direction. The light-absorbing member 251 inhibits the irradiation light L in the divergent state emitted from the light source 210 from being directly incident on the detecting member 240.

A light-absorbing member 252 is disposed on the positive Y side of the deflecting member 221. The light-absorbing member 252 is disposed on the opposite side of the detecting member 240 with respect to the deflecting member 221. In other words, of the irradiation light L emitted from the light source 210, the light-absorbing member 252 absorbs a part of the irradiation light L that is not transmitted through the deflecting member 221 and is deflected by the deflecting member 221. As a result, it is possible to inhibit the irradiation light L deflected by the deflecting member 221 from being irregularly reflected by the inner wall of the exterior member 100 and being incident on the detecting member 240 as stray light.

The electronic pen 2 according to the second embodiment described above is provided with the light source 210 that emits the irradiation light L, the rotatable rotating body 230, the deflecting member 221 that transmits the irradiation light L emitted by the light source 210 toward the rotating body 230 and deflects the irradiation light L reflected by the rotating body 230, and the detecting member 240 that receives the irradiation light L deflected by the deflecting member 221.

According to this configuration, the irradiation light L emitted from the light source 210 and transmitted through the deflecting member 221 and the irradiation light L reflected by the rotating body 230 pass along a common optical path or optical paths in close proximity to each other between the deflecting member 221 and the rotating body 230. With this configuration, it is possible to suppress an increase in the size of the electronic pen 2, compared to a configuration in which the optical path from the light source 210 to the rotating body 230 and the optical path from the rotating body 230 to the detecting member 240 are separately disposed.

2-2 Sixth Modified Example

Figure 9:
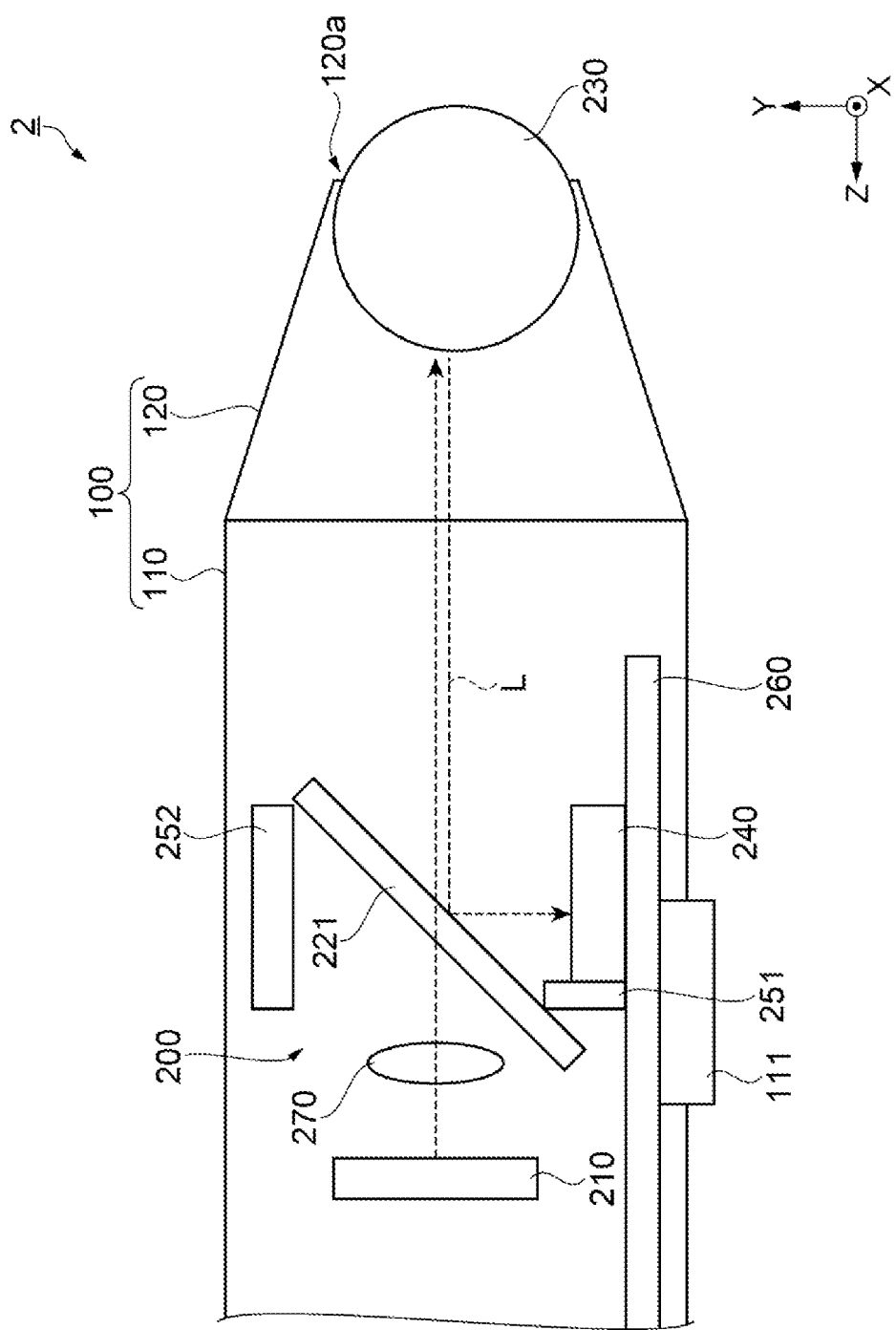
FIG. 9 is an enlarged cross-sectional view illustrating the optical device, according to a sixth modified example, of the electronic pen according to the second embodiment.

FIG. 9 is an enlarged cross-sectional view illustrating the optical device 200 according to a sixth modified example, of the electronic pen 2 according to the second embodiment. As illustrated in FIG. 9, the optical device 200 is provided with the optical member 270 between the light source 210 and the deflecting member 221. In other words, the optical member 270 is disposed on the negative Z side of the light source 210 and on the positive Z side of the deflecting member 221. The optical member 270 condenses or collimates the irradiation light L emitted in the divergent state from the light source 210. In this way, since the divergence of the irradiation light L is suppressed, it is possible to increase the light utilization rate of the irradiation light L emitted from the light source 210.

2-3 Seventh Modified Example

Figure 10:
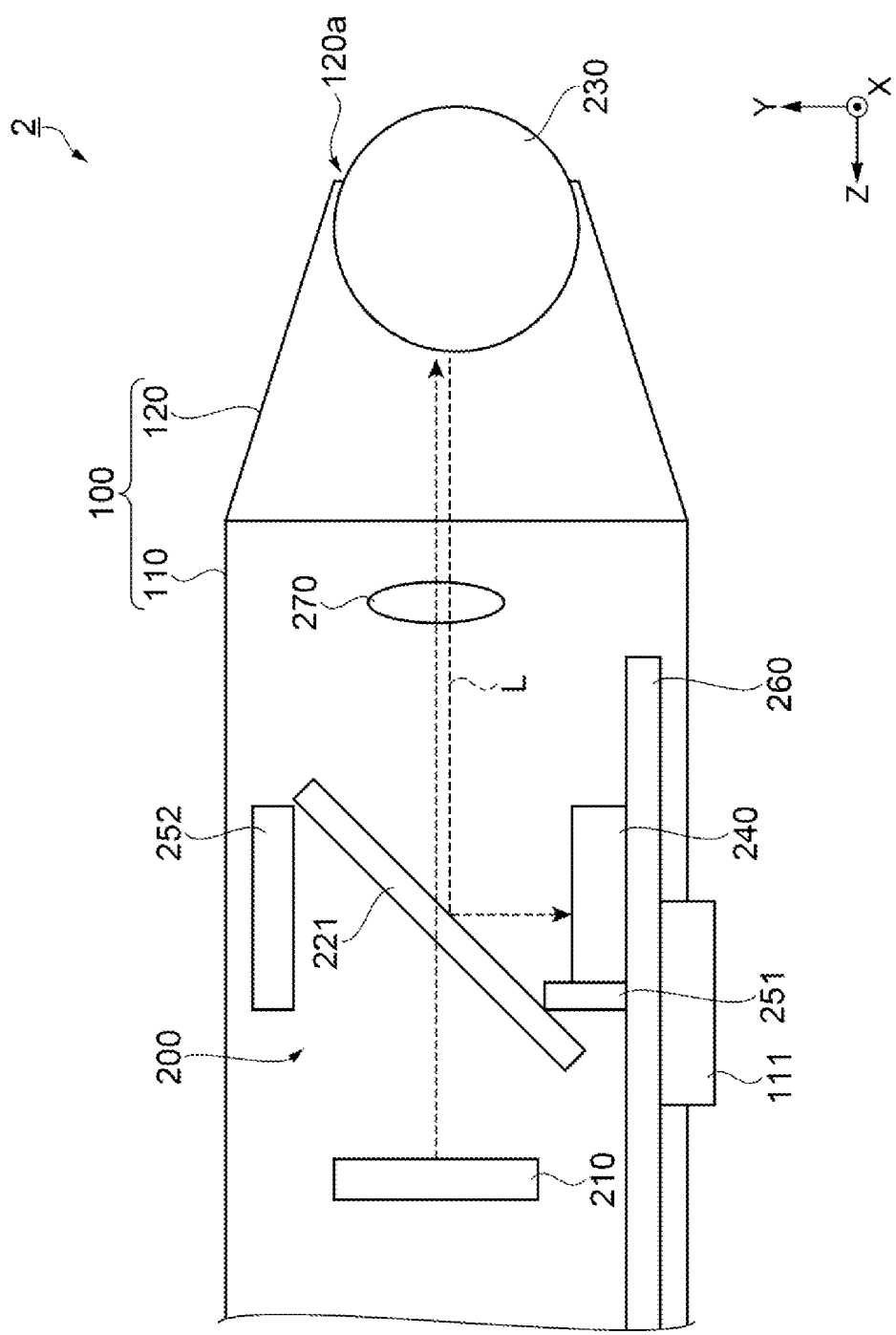
FIG. 10 is an enlarged cross-sectional view illustrating the optical device, according to a seventh modified example, of the electronic pen according to the second embodiment.

FIG. 10 is an enlarged cross-sectional view illustrating the optical device 200 according to a seventh modified example, of the electronic pen 2 according to the second embodiment. As illustrated in FIG. 10, the optical member 270 may be disposed between the deflecting member 221 and the rotating body 230, in a similar manner to the second modified example. In other words, the optical member 270 may be disposed on the negative Z side of the deflecting member 221 and on the positive Z side of the rotating body 230. The irradiation light L directed to the rotating body 230 and the irradiation light L reflected by the rotating body 230 are condensed or collimated by the optical member 270. In other words, since the divergence of the irradiation light L is suppressed, it is possible to increase the light utilization rate of the irradiation light L emitted from the light source 210.

2-4 Eighth Modified Example

Figure 11:
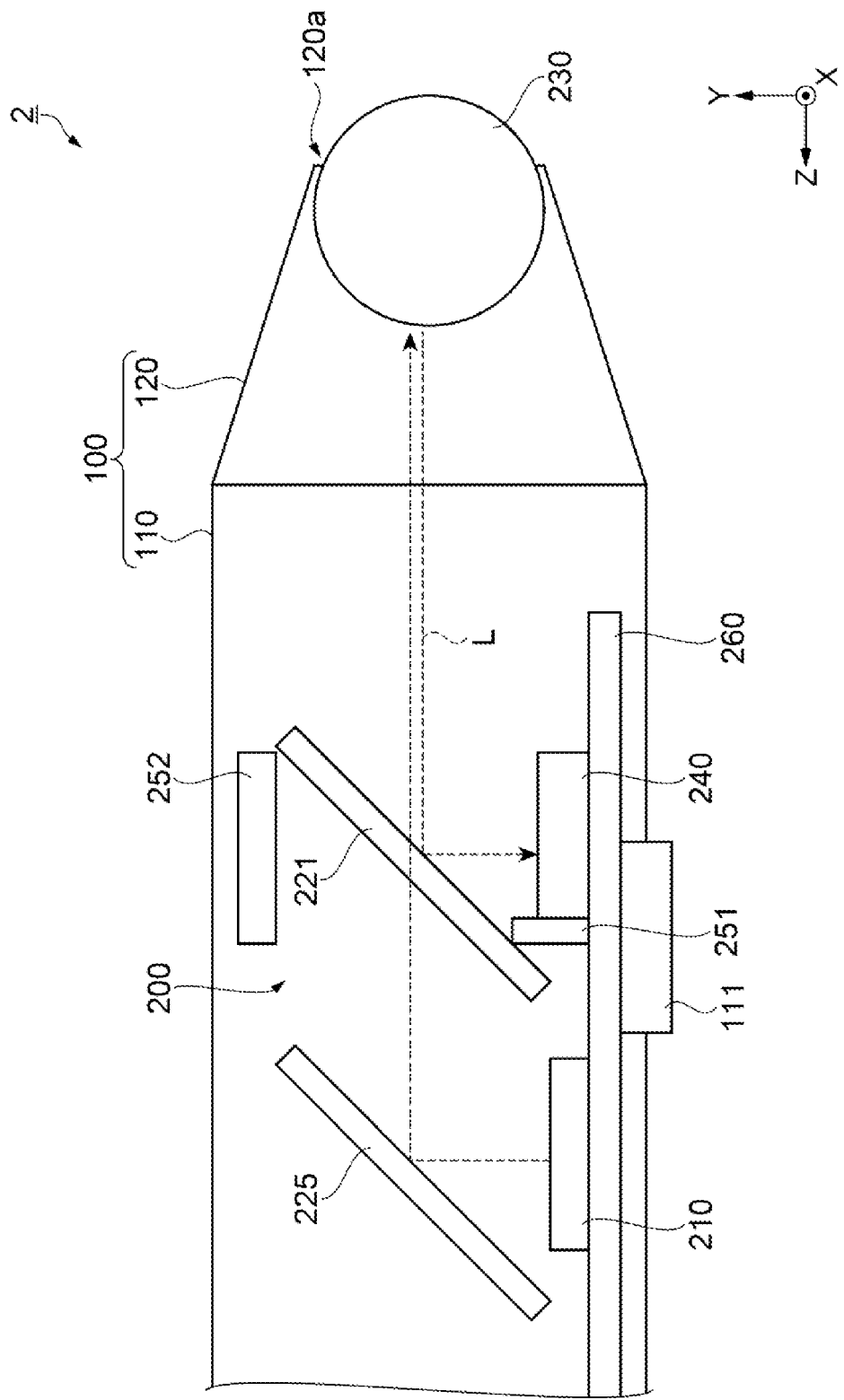
FIG. 11 is an enlarged cross-sectional view illustrating the optical device, according to an eighth modified example, of the electronic pen according to the second embodiment.

FIG. 11 is an enlarged cross-sectional view illustrating the optical device 200 according to an eighth modified example, of the electronic pen 2 according to the second embodiment. As illustrated in FIG. 11, the light source 210 may be disposed on the substrate 260, in a similar manner to the detecting member 240. In this case, the light source 210 is disposed on the positive Z side of the detecting member 240 and emits the irradiation light L toward the positive Y direction. For this reason, the optical device 200 is provided with a deflecting member 225 that deflects the irradiation light L emitted by the light source 210 toward the deflecting member 221. In a similar manner to the deflecting member 221, the deflecting member 225 is, for example, a half mirror formed of a metal film or a dielectric multilayer film, and corresponds to the second deflecting member. The deflecting member 225 is disposed on the positive Y side of the light source 210, and is disposed in a posture parallel to the deflecting member 221, that is, in a posture in which a reflection surface thereof is inclined at approximately 45° with respect to both the Y-axis and the Z-axis, such that the irradiation light L traveling in the positive Y direction can be reflected in the negative Z direction. The deflecting member 225 is supported at the handle 110 or the substrate 260 by a support member (not illustrated). Since the light source 210 and the detecting member 240 are disposed on the same substrate 260, it is possible to reduce a member or the like that electrically couples the light source 210 and the substrate 260, and it is thus possible to inhibit the configuration of the electronic pen 2 from becoming complicated.

2-5 Ninth Modified Example

In the second embodiment and the eighth modified example, the deflecting members 221 and 225 are the half mirror, but the configuration of the deflecting members 221 and 225 is not limited thereto. In a similar manner to the fourth modified example, the deflecting members 221 and 225 may be, for example, a surface relief diffraction element or a volume hologram diffraction element.

Figure 12:
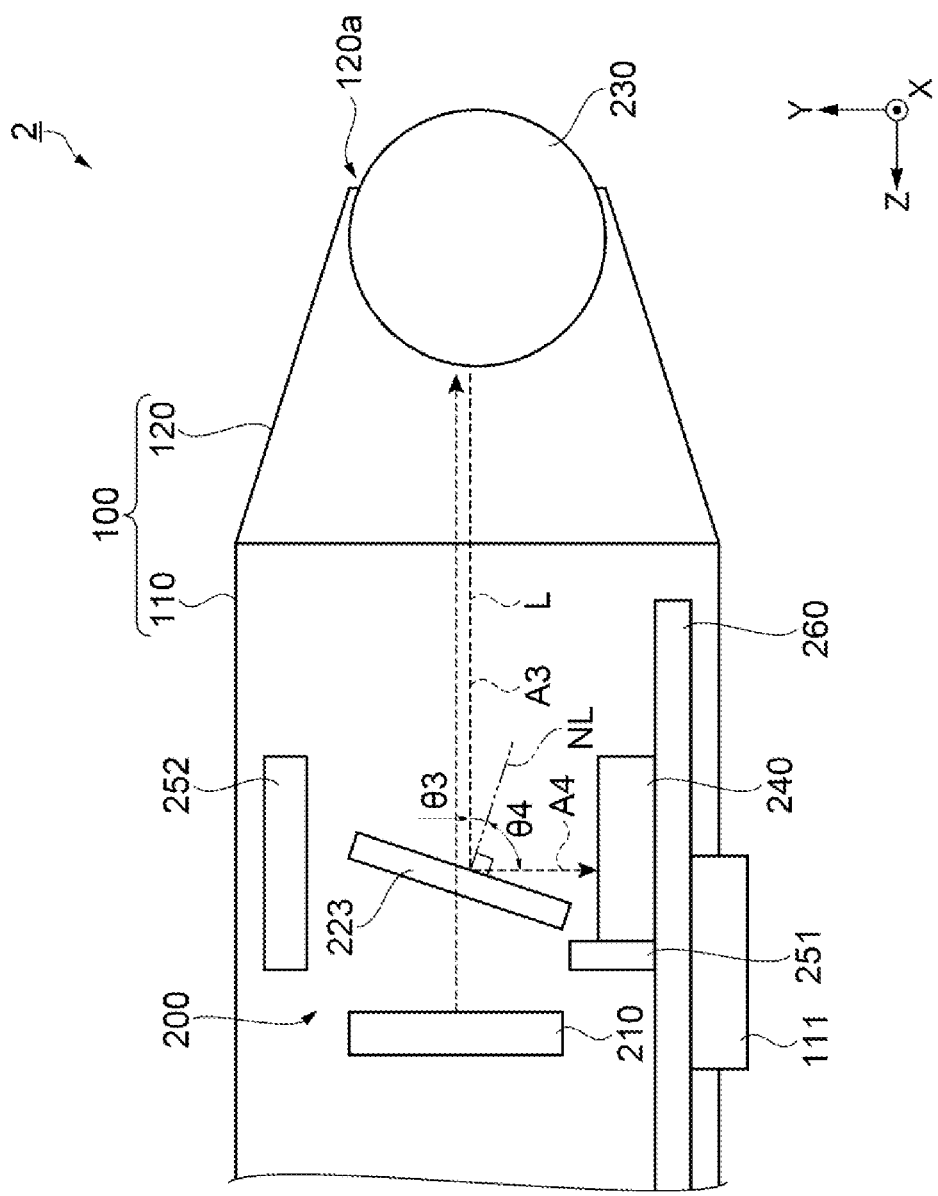
FIG. 12 is an enlarged cross-sectional view illustrating the optical device, according to a ninth modified example, of the electronic pen according to the second embodiment.

FIG. 12 is an enlarged cross-sectional view illustrating the optical device 200 according to a ninth modified example, of the electronic pen 2 according to the second embodiment, and illustrates a configuration in which the deflecting member 223 that is the diffraction element is used instead of the deflecting member 221.

As illustrated in FIG. 12, when the deflecting member 223 is the diffraction element, an angle θ3 formed between a principal axis A3 of the irradiation light L reflected by the rotating member 230 and incident on the deflecting member 223 and the normal line NL of the surface of the deflecting member 223 on which the irradiation light L from the rotating member 230 is incident can be made smaller than an angle θ4 formed between a principal axis A4 of the irradiation light L deflected by the deflecting member 223 and the normal line NL. As a result, compared to when the deflecting member 221 that is the half mirror is used, it is possible to alleviate limitations on the angle of the deflecting member 223 with respect to the rotating body 230, and to shorten the length of the deflecting member 223 in the Z direction. By shortening the length of the deflecting member 223 in the Z direction, the distance between the rotating member 230 and the detecting member 240 can be reduced. Thus, an increase in the size of the optical device 200 in the Z direction can be suppressed.

The angle θ4 formed between the principal axis A4 of the irradiation light L deflected by the deflecting member 223 and the normal line NL is preferably greater than 45° and less than 85°, and is more preferably approximately 70°.

When the angle θ4 is equal to or less than 45°, the deflecting member 223 is inclined along the Z direction, and thus, although the length in the Y direction is suppressed, the length in the Z direction is increased compared to when the deflecting member 221 that is the half mirror is used. Therefore, when the angle θ4 is equal to or less than 45°, the distance between the rotating body 230 and the detecting member 240 becomes longer than when the deflecting member 221 that is the half mirror is used, and the size of the optical device 200 increases in the Z direction.

On the other hand, when the angle θ4 is equal to or greater than 85°, since the deflecting member 223 is inclined so as to be orthogonal to the Z direction, it becomes difficult to diffract the irradiation light L reflected by the rotating body 230 toward the detecting member 240. Accordingly, the light amount of the irradiation light L received by the detecting member 240 is reduced with respect to the light amount of the irradiation light L emitted by the light source 210, and the light use efficiency in the optical device 200 deteriorates.

Further, in a similar manner to the fourth modified example, when the deflecting member 223 is the volume hologram diffraction element, it is possible to condense or collimate the irradiation light L in the divergent state, using the refractive index of the base portion and the hologram fringes.

Accordingly, since it is not necessary to dispose the optical member 270 for condensing or collimating the irradiation light L in the divergent state, it is possible to reduce the number of the members inside the electronic pen 2.

2-6 Tenth Modified Example

Figure 13:
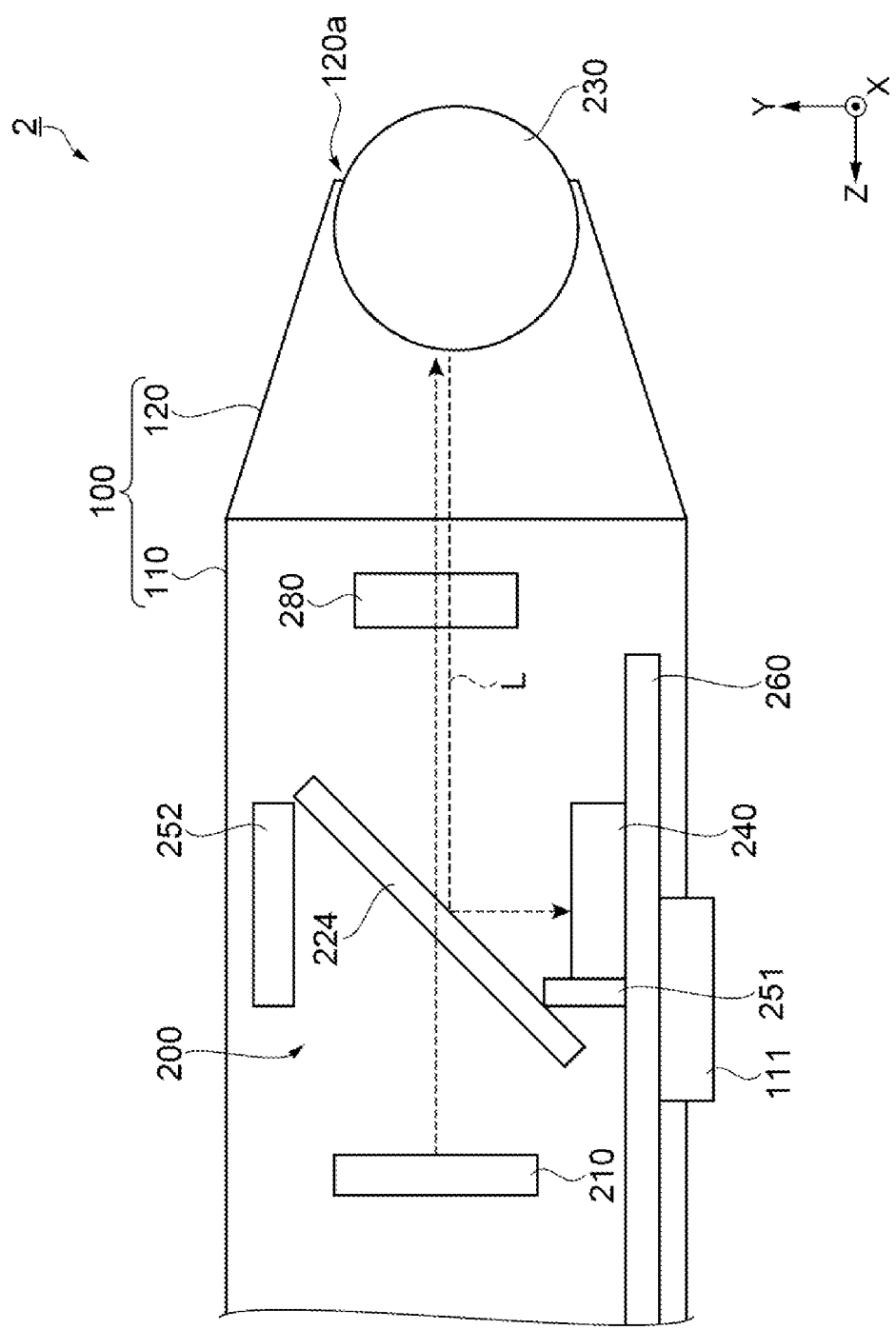
FIG. 13 is an enlarged cross-sectional view illustrating the optical device, according to a tenth modified example, of the electronic pen according to the second embodiment.

FIG. 13 is an enlarged cross-sectional view illustrating the optical device 200 according to a tenth modified example, of the electronic pen 2 according to the second embodiment. As illustrated in FIG. 13, the optical device 200 is provided with the deflecting member 224 instead of the deflecting member 221, and the λ/4 wave plate 280 between the deflecting member 224 and the rotating body 230. The λ/4 wave plate 280 is disposed between the deflecting member 224 and the rotating body 230 in the Z direction, that is, on the negative Z side of the deflecting member 224 and on the positive Z side of the rotating body 230. Further, in this configuration, the light source 210 emits the linearly polarized irradiation light L. Further, the deflecting member 224 is constituted by the polarization beam splitter, transmits polarized light having the same vibration direction as the linearly polarized irradiation light L emitted by the light source 210, and reflects polarized light having a vibration direction orthogonal to the vibration direction of the irradiation light L emitted by the light source 210.

The linearly polarized irradiation light L emitted from the light source 210 passes through the polarizing member 224 and is incident on the λ/4 wave plate 280. Subsequently, the linearly polarized irradiation light L changes from the linearly polarized light to the circularly polarized light when passing through the λ/4 wave plate 280, and is incident on the rotating body 230.

The circularly polarized irradiation light L incident on the rotating body 230 is reflected by the rotating body 230 toward the λ/4 wave plate 280 and once more passes through the λ/4 wave plate 280. When passing through the λ/4 wave plate 280, the circularly polarized irradiation light L becomes the linearly polarized light having the vibration direction orthogonal to that of the linearly polarized light of the irradiation light L emitted by the light source 210, and is subsequently reflected by the deflecting member 224 to be incident on the detecting member 240.

According to this configuration, most of the irradiation light L emitted from the light source 210 is transmitted through the deflecting member 224 that is the polarization beam splitter. Further, most of the irradiation light L reflected by the rotating body 230 is reflected by the deflecting member 224. Thus, it is possible to increase the light utilization rate of the irradiation light L while suppressing stray light generated when the irradiation light L emitted from the light source 210 is deflected without passing through the deflecting member 224.

Note that the linearly polarized irradiation light L emitted from the light source 210 is not particularly limited, and is, for example, the S-polarized light or P-polarized light.

3 Other Modified Examples

In the above-described embodiments, the half mirror, the diffraction element, and the polarization beam splitter are exemplified as the deflecting members 221, 222, 223, 224, and 225 that deflect the irradiation light L. However, the deflecting members 221, 222, 223, 224, and 225 are not limited to these configurations, and may be, for example, a member that deflects light using optical refraction.

In the above-described embodiments, the electronic pens 1 and 2, which are the pen-type pointing devices, are described as the examples of the electronic apparatus. However, the electronic apparatus may be a pointing device other than the pen-type pointing device. Further, the electronic apparatus may be an electronic apparatus other than the pointing device.

What is claimed is:
1. An electronic apparatus comprising:
a light source configured to emit irradiation light;
a rotating body configured to rotate;
a first deflecting member configured to deflect, toward the rotating body, the irradiation light emitted by the light source and to transmit the irradiation light reflected by the rotating body;
a detecting member configured to receive the irradiation light transmitted through the first deflecting member; and
a λ/4 wave plate disposed between the first deflecting member and the rotating body, wherein
the irradiation light emitted from the light source is first polarized light, and
the first deflecting member deflects the first polarized light and transmits second polarized light different from the first polarized light.

2. The electronic apparatus according to claim 1, wherein the first deflecting member is disposed between the rotating body and the detecting member.

3. The electronic apparatus according to claim 1, further comprising:
a substrate on which the light source and the detecting member are disposed; and
a second deflecting member configured to deflect, toward the detecting member, the irradiation light transmitted through the first deflecting member.

4. The electronic apparatus according to claim 1, further comprising:
a light-absorbing member disposed on an opposite side from the light source with respect to the first deflecting member, and configured to absorb, of the irradiation light emitted by the light source, the irradiation light that is not deflected by the first deflecting member and is transmitted through the first deflecting member.

5. The electronic apparatus according to claim 1, wherein the first deflecting member is a diffraction element, and
an angle formed between a principal axis of the irradiation light incident on the first deflecting member and a normal line of a surface, of the first deflecting member, on which the irradiation light is incident is greater than 45° and less than 85°.

6. The electronic apparatus according to claim 5, wherein the diffraction element is a volume hologram diffraction element.

7. The electronic apparatus according to claim 1, further comprising:
an optical member provided between the light source and the first deflecting member, and configured to condense the irradiation light.

8. The electronic apparatus according to claim 1, further comprising:
an optical member provided between the rotating body and the first deflecting member, and configured to condense the irradiation light.

9. An electronic apparatus comprising:
a light source configured to emit irradiation light;
a rotating body configured to rotate;
a first deflecting member configured to transmit, toward the rotating body, the irradiation light emitted by the light source and to deflect the irradiation light reflected by the rotating body; and
a detecting member configured to receive the irradiation light deflected by the first deflecting member; and
a λ/4 wave plate disposed between the first deflecting member and the rotating body, wherein
the irradiation light emitted from the light source is first polarized light, and the first deflecting member transmits the first polarized light and deflects second polarized light different from the first polarized light.

10. The electronic apparatus according to claim 9, wherein
the first deflecting member is disposed between the rotating body and the light source.

11. The electronic apparatus according to claim 9, further comprising:
a substrate on which the light source and the detecting member are disposed; and
a second deflecting member configured to deflect, toward the first deflecting member, the irradiation light emitted by the light source.

12. The electronic apparatus according to claim 9, further comprising:
a light-absorbing member disposed on an opposite side from the detecting member with respect to the first deflecting member, and configured to absorb, of the irradiation light emitted by the light source, the irradiation light that is not transmitted through the first deflecting member and is deflected by the first deflecting member.

13. The electronic apparatus according to claim 9, wherein
the first deflecting member is a diffraction element, and
an angle formed between a normal line of a surface, of the first deflecting member, on which the irradiation light is incident and a principal axis of the irradiation light deflected by the first deflecting member is greater than 45° and less than 85°.

14. The electronic apparatus according to claim 13, wherein
the diffraction element is a volume hologram diffraction element.

* * * * *